United States Patent [19]
Grittmann et al.

[11] Patent Number: 5,515,223
[45] Date of Patent: May 7, 1996

[54] CLEANING CASSETTE FOR MAGNETIC HEADS

[75] Inventors: Ernst-Jürgen Grittmann, Ludwigshafen; Peter Hammerschmitt, Brühl; Peter Felleisen, Lampertheim; Volker Koch, Battenberg, all of Germany

[73] Assignee: BASF Magnetics GmbH, Mannheim, Germany

[21] Appl. No.: 309,440

[22] Filed: Sep. 20, 1994

[30] Foreign Application Priority Data

Sep. 21, 1993 [DE] Germany .......................... 9314210 U
Feb. 16, 1994 [DE] Germany .......................... 9402543 U

[51] Int. Cl.⁶ .................................................. G11B 5/41
[52] U.S. Cl. ........................................... 360/128; 360/132
[58] Field of Search ..................................... 360/128, 132

[56] References Cited

U.S. PATENT DOCUMENTS

| 4,569,098 | 2/1986 | Kawabe | 360/128 X |
| 4,816,951 | 3/1989 | Zago | 360/128 |

FOREIGN PATENT DOCUMENTS

| 1-292616 | 11/1989 | Japan | 360/128 |
| 2-310815 | 12/1990 | Japan | 360/128 |
| 3-108114 | 5/1991 | Japan | 360/128 |

*Primary Examiner*—John H. Wolff
*Attorney, Agent, or Firm*—Keil & Weinkauf

[57] ABSTRACT

A cleaning cassette for magnetic heads in a cassette drive includes at least one container with cleaning fluid, comprising an at least partially flexible hollow body, at least one valve device and at least one feed channel for the cleaning fluid to the cleaning device. The cleaning system can be used for tape cassettes and disk cassettes with magnetic medium.

13 Claims, 3 Drawing Sheets

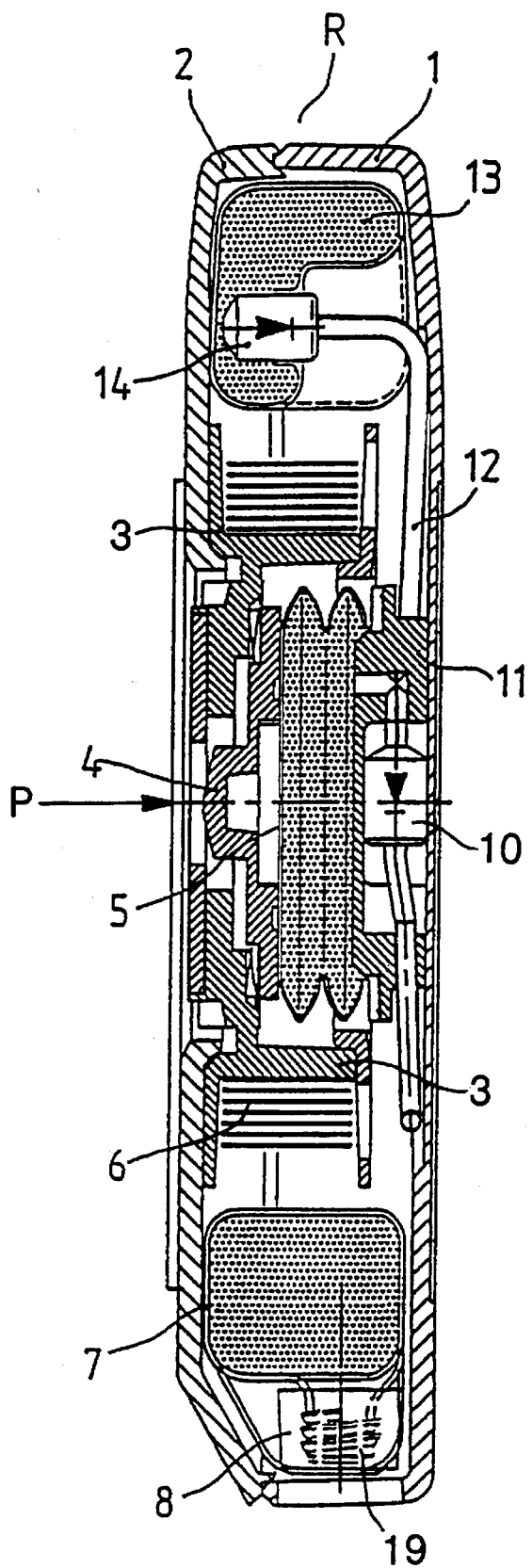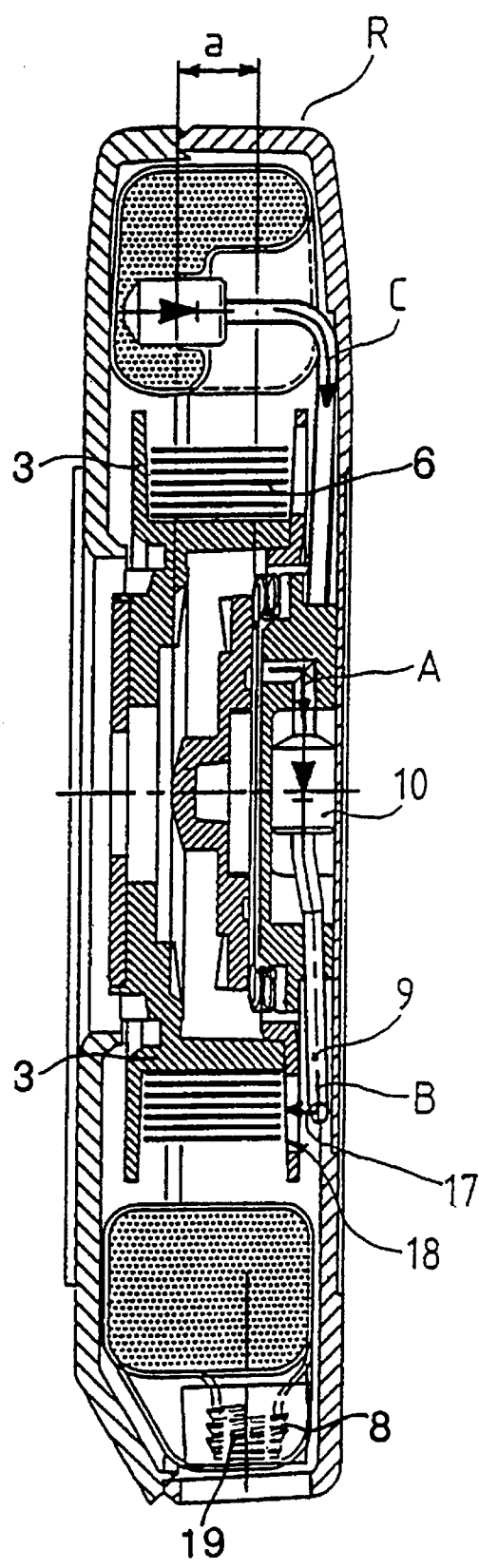
FIG.2  FIG.3

CLEANING CASSETTE FOR MAGNETIC HEADS

BACKGROUND OF THE INVENTION

1. Field of the Invention

The invention relates to a cleaning cassette for magnetic heads in a magnetic medium drive, comprising a housing, corresponding to the magnetic medium cassette, with a blocking or braking device for the magnetic medium, a cleaning means instead of the magnetic medium and a container with cleaning fluid and a suitable solenoid non-return valve therefor.

Such a magnetic medium cassette is known, for example, in the form of a magnetic tape cassette or a cassette with a magnetic disk, for example a diskette, in each case for data recording.

2. Description of the Related Art

For audio and video tape cassettes, dry cleaning cassettes are known, by means of which only the pole faces of the head near the gap are abrasively removed, with all the associated disadvantages. DE-A-32 46 877 also discloses a cleaning cassette for the compact cassette system, an endless cleaning tape being provided with cleaning fluid by means of a mechanical cam and piston control whenever the cassette is inserted into the equipment and a winding hub is driven.

The fluid is in this case provided in a receiving cavity of the cassette and passes via a metering device and an outlet valve on to the cleaning tape and consequently also on to the signal heads. On account of the complex control mechanism and the additional endless tape, this cleaning system is very expensive.

It is also possible in another configuration to design a roller in the cassette with a core and a bypass section of absorbent material, so that when the cleaning tape is driven, it is provided with cleaning fluid.

SUMMARY OF THE INVENTION

It is an object of the invention to provide a largely automatically operating cleaning cassette which is simple and expedient.

We have found that this object is achieved by a cassette of the type described at the beginning by the container including at least one flexible hollow body for the cleaning fluid and having a feed channel, a valve device being provided between the flexible hollow body and the feed channel.

The flexible hollow body is expediently designed as a bellows.

In a further embodiment, the container may also be configured as at least one flexible hollow body and partially as a rigid hollow body.

The at least one flexible hollow body is advantageously arranged in such a way that it can be actuated together with the blocking or braking device of the cassette, thereby ensuring that an actuation of the fluid container cannot take place in the equipment until immediately before the cassette is put into operation.

In a practical design, a first valve device is provided between the flexible hollow body and the feed channel and a second valve device is provided between the rigid hollow body and the feed channel.

In a further embodiment, a pressure-equalizing valve is arranged on the rigid hollow body.

The valve device(s) is (are) expediently designed as (a) solenoid non-return valve(s).

For a cleaning cassette with a cleaning tape as the cleaning means, the cleaning tape may be wound up on a reel with at least one flange, the flange being provided with through-openings for the cleaning fluid.

In a further advantageous embodiment, the at least one distributor tube may be arranged substantially circularly over through-openings, approximately in the form of segments of a circle, of the reel or of a covering body. This has the advantage that the cleaning fluid is distributed as far as possible over the supply of wound-up cleaning tape.

In a further design, the bellows is connected on the one hand to the blocking or braking device of the cassette and on the other hand to a cover for distributing the fluid. Consequently, there is formed a central modular unit, which can be prefabricated.

Further embodiments of the invention relate to a suitable solenoid non-return valve.

BRIEF DESCRIPTION OF THE DRAWINGS

An exemplary embodiment of a cleaning cassette according to the invention is represented in the drawing and is described below with reference to the said drawing, in which:

FIG. 2 shows the cleaning cassette in cross section according to lines of intersection II—II with a filled flexible hollow body FIG. 3 shows the cleaning cassette according to FIG. 2 with an empty flexible hollow body.

DESCRIPTION OF THE PREFERRED EMBODIMENTS

Figure 1:
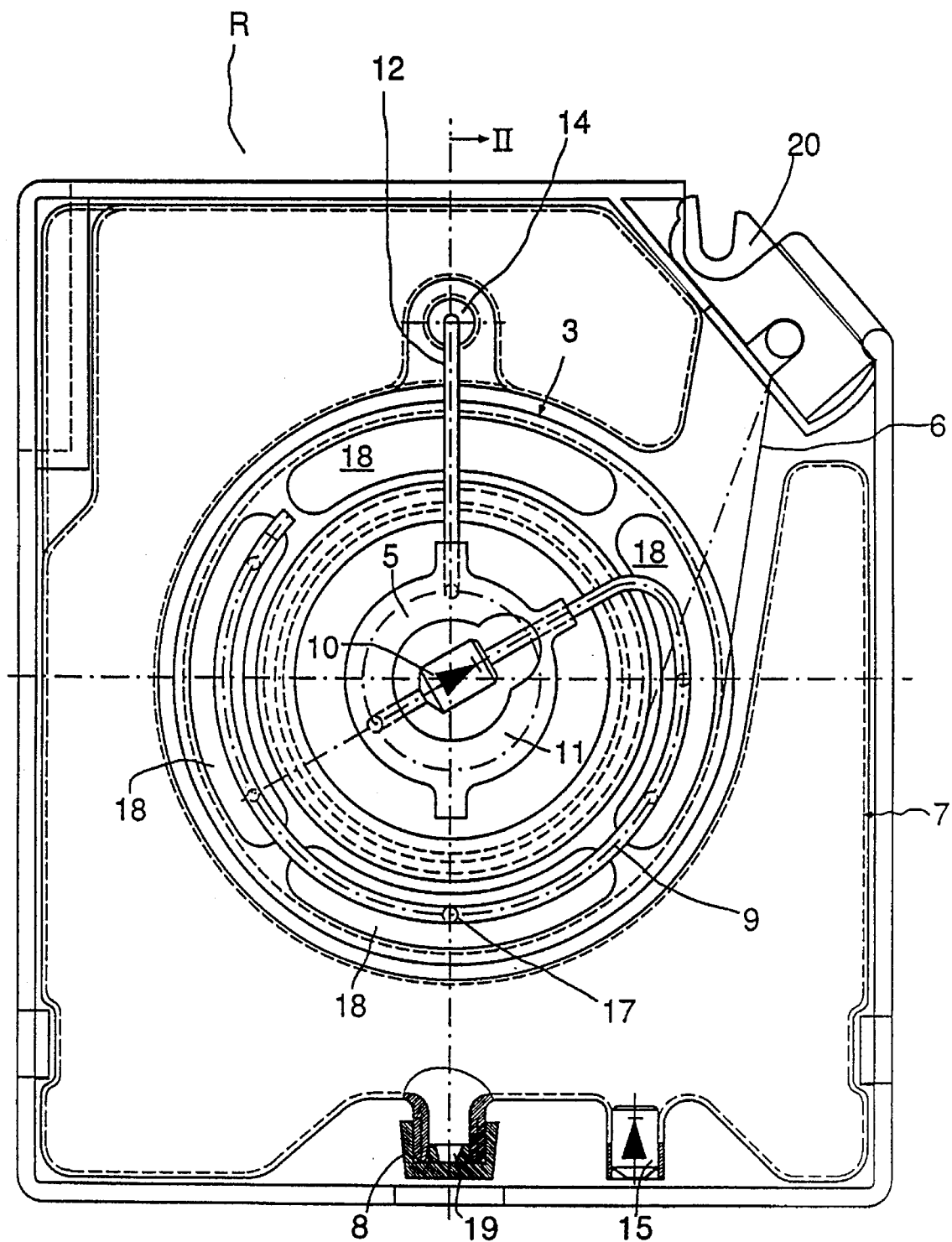
FIG. 1 shows a cleaning cassette in plan view and as a transparent body
Figure 4:
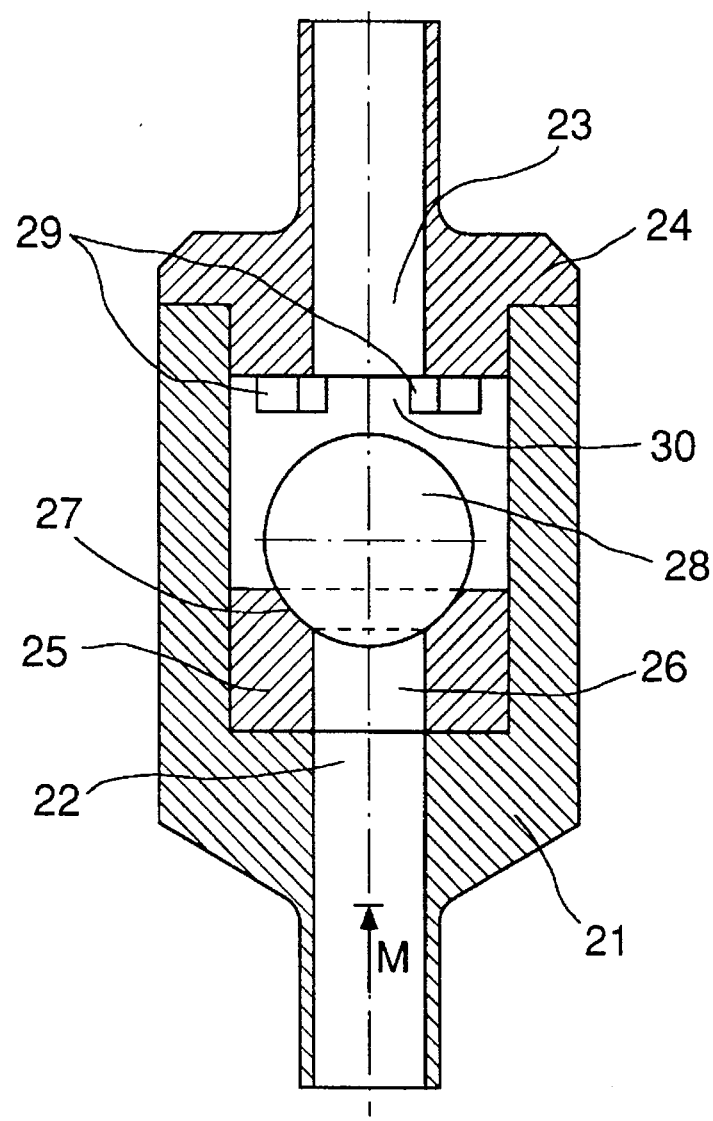
FIG. 4 shows a solenoid non-return valve.

The cleaning cassette R comprises a housing, formed by the upper part 1 and the lower part 2 and a reel 3 contained therein, with reel brake 4 and, as the flexible hollow body, a bellows 5, in operative connection with the reel brake 4. The reel 3 bears a wound-up cleaning tape 6. Arranged around the reel 3 is a tank 7 for the cleaning fluid, for example isopropanol or some other suitable cleaning medium, which can be closed by means of a closure cap 8. A feed channel, distributor tube 9, is in connection with the interior of the bellows 5 via a valve device, solenoid valve 10. The bellows 5 is connected to a distributor cover 11 and is consequently closed at the bottom. The distributor cover 11 is provided with openings for the distributor tube 9 and the intake tube 12. Tank 7 and bellows 5 are connected to each other via an intake tube 12, a further valve device, solenoid valve 14, being provided directly on the tank 7. By means of a third valve device, solenoid valve 15, the tank can be connected to the outside air.

The cleaning cassette R corresponds in its form to a known magnetic tape cassette for data recording and is therefore suitable for being inserted into a corresponding cassette drive.

By pressure on the reel brake 4 (arrow P in FIG. 2) in the drive (not shown), the reel 3 with the cleaning tape 6 is unlocked and can rotate freely in the housing of the cassette R (FIG. 3). The bellows 5, in operative connection with the reel brake 4, is consequently compressed within a very short time (<1 sec) by the distance a in comparison with the position in FIG. 2.

As a result, the cleaning fluid located in the bellows 5 is conducted out via the solenoid valve 10 and the distributor tube 9, which is closed at the end, passes through the outlet openings 17, provided in the distributor tube 9, and as a result goes through the inlet openings 18, for example in the form of segments of a circle, (arrows A and B in FIG. 3) into the reel 3 and consequently on to the cleaning tape 6. Approximately at the same time, the cleaning tape 6, which is connected to the guide block 20, is moved out from the cassette R by drawing out the guide block 20 in the drive. This achieves the effect that the length of the cleaning tape 6 is already provided with the cleaning fluid when it leaves the cassette R and is available for cleaning. The cleaning operation itself takes place by the magnetic head or heads of the drive undergoing moist precleaning by means of the entire length of the cleaning tape (length for example 6–7 m). During the subsequent reeling-in of the cleaning tape 6, the same head or heads undergoes or undergo either moist cleaning again or aftercleaning, or, if the cleaning fluid is readily volatile, as for example in the case of isopropanol, drycleaning or aftercleaning.

In any event, by simple utilization of the normal drive functions, at least the above two cleaning operations can be carried out one after the other.

Once the cleaning operation has been completed, when the guide block 20 is again in the cassette R, the cassette R is ejected from the equipment or removed by robot or by hand.

Discontinuation of the pressure P on the braking plate 4 causes the bellows 5 to expand and assume its form in FIG. 2. During this, the solenoid valve 10 closes, the solenoid valve 14 opens and cleaning fluid flows out of the tank 7 (arrow C in FIG. 3) into the bellows 5, until the latter is filled and the solenoid valve 14 closes again. The subatmospheric pressure resulting in the tank 7 is equalized by opening the solenoid valve 15.

In the position of the bellows 5 in FIG. 2, the braking plate 4 is again in contact with the housing, so that once again an insertion of the cassette R into the equipment for a further cleaning operation can commence.

The cleaning cassette R described has a tank 7, the volume of which is many times, in particular about 25 times, greater than the volume of the bellows 5, so that about 25 cleaning operations can be accomplished. Subsequently, the tank 7 can be refilled via the filling opening 19.

A commercially available data magnetic tape cartridge can be converted into a cleaning cassette R by cutting out the central projection on the bottom part, the annular webs in the bottom part and top part, fitting the tank 7, removing the reel leaf spring and exchanging the magnetic tape reel for the unit comprising: reel with cleaning tape 6 and braking plate 4, bellows 5 and distributor cover 11 with distributor tube 9 and tank 7. However, it can also be produced directly by injection molding.

When mention is made of valve devices or solenoid valves, simple solenoid non-return valves, which are substantially formed by a magnetic valve seat and a closing body of ferromagnetic material, can be used expediently. Spacing elements at a valve opening prevent closure of this valve opening, so that the valve is a one-direction valve.

A suitable solenoid non-return valve is described below. It goes without saying that solenoid non-return valves of some other design or other equivalent valve configurations for very small pressure differences can be used for the purposes of the present invention.

In the case of the previously customary non-return valves, a spring supported on the housing presses the closing body, usually a ball, into the valve seat. In the case of these valves, the opening pressure is dependent on the spring force. Non-return valves which operate without a spring are position-dependent, since the closing force is determined by the weight of the ball. The opening pressure is therefore small in the case of these valves.

If a non-return valve is to operate both position-independently and with a small opening pressure, valves with a compression spring are disadvantageous, since not only the dead weight of the ball but also the spring force has to be overcome.

The non-return valve (10, 14, 15) comprises a housing 21 with an inlet 22 and an outlet 23 for the pressurized medium M. In the present embodiment, the outlet is formed in a cover 24 which closes off the housing and the fastening means of which are not shown in any more detail. These may be conventional means of connection, such as screws, adhesion or a press fit.

On the inlet side there is arranged in the housing 21 a sealing part 25, which has a bore 26 extending the length of the inlet 22. The bore runs out toward the interior of the housing into a valve seat 27 for a closing body taking the form of a ball 28. The part 25 consists of magnetic material, for example comprising a flexible magnetic body, so that the freely movable ball 28 consisting of ferromagnetic material is drawn by the magnetic field of the part 25 into the valve seat 27. The pressure of the medium flowing through causes the ball to be moved into an opening position, the opening pressure being determined by the strength of the magnetic field. This must, however, be strong enough for the ball to be drawn from any position in the housing back into the valve seat as soon as the pressure of the medium has dropped below a certain minimum value.

Provided around the outlet opening 23 on the inner wall of the housing cover 24 are spacing elements 29, which prevent the ball 28 being pressed under the flow of medium into the opening and thereby closing the latter. Openings 30 for the flow of medium are provided between or in the spacing elements.

The solenoid non-return valve described above can also be used advantageously for other purposes and media than for the cleaning cassette described here.

The cleaning tape 6 may consist of suitable material, which has cleaning properties in the dry state and in the wet state. Suitable materials are, for example, polyamide and polyester tapes with suitable cleaning surfaces.

The invention has been described in detail by the example of a one-reel magnetic tape cassette.

It is, however, readily possible also to use a similar cleaning cassette for other types of cassette, such as compact cassettes (CCs) or digital compact cassettes (DCCs) or video cassettes of all types.

A cleaning cassette for magnetic heads in a cassette drive includes at least one container with cleaning fluid, comprising an at least partially flexible hollow body, at least one valve device and at least one feed channel for the cleaning fluid to the cleaning device. The cleaning system can be used for magnetic media in tape cassettes and disk cassettes.

We claim:

1. A cleaning cassette for magnetic heads in a magnetic medium drive, comprising a housing, corresponding to a standard magnetic medium cassette having a blocking or braking device for a magnetic medium contained therein, this cleaning cassette lacking the magnetic medium and having a cleaning means and a container with cleaning fluid, wherein the container includes at least one at least partially flexible hollow body for the cleaning fluid and has at least one feed channel, a valve device being provided between the flexible hollow body and the feed channel.

2. The cassette as defined in claim 1, wherein the flexible hollow body is designed as a bellows.

3. The cassette as defined in claim 2, wherein the bellows is connected on the one hand to the blocking or braking device of the cassette (R) and on the other hand to a cover for distributing the fluid.

4. The cassette as defined in claim 1, wherein the at least one at least partially flexible hollow body included in the container is partially rigid.

5. The cassette as defined in claim 1, wherein the flexible hollow body is arranged in such a way that it is actuated by the same action which actuates the blocking or braking device of the standard cassette.

6. The cassette as defined in claim 1, wherein a first valve device is provided between the flexible hollow body and the feed channel and a second valve device is provided between the rigid hollow body and the feed channel.

7. The cassette as defined in claim 1 wherein a non-return valve is provided on the hollow body.

8. The cassette as defined in claim 1, wherein the valve device is designed as a solenoid non-return valve.

9. A non-return valve for a cleaning cassette as defined in claim 8, comprising a housing with an inlet and an outlet, an inlet-side valve seat formed in said housing for a closing body, which closes off said seat and can be moved under the pressure of the medium into an opening position, and means holding said closing body in the valve seat against a limited opening pressure, wherein the material forming the valve seat is magnetic and the closing body consists of ferromagnetic material.

10. The non-return valve as defined in claim 9, wherein the closing body is a ball.

11. The non-return valve as defined in claim 9, wherein, as a stop for the closing body, there are arranged around the outlet opening on the inner wall of the housing spacing elements, between which openings for the flow of medium are formed.

12. The cassette as defined in claim 1 with a cleaning tape as the cleaning means, wherein the cleaning tape is wound up on a reel with at least one flange, the flange being provided with through-openings for the cleaning fluid.

13. The cassette as defined in claim 12, wherein the at least one feed channel is arranged substantially circularly over the through-openings of the reel, approximately in the form of segments of a circle.

* * * * *